Oct. 19, 1926.
H. C. LORD
1,603,348
VIBRATION DAMPENER
Filed Dec. 19, 1924
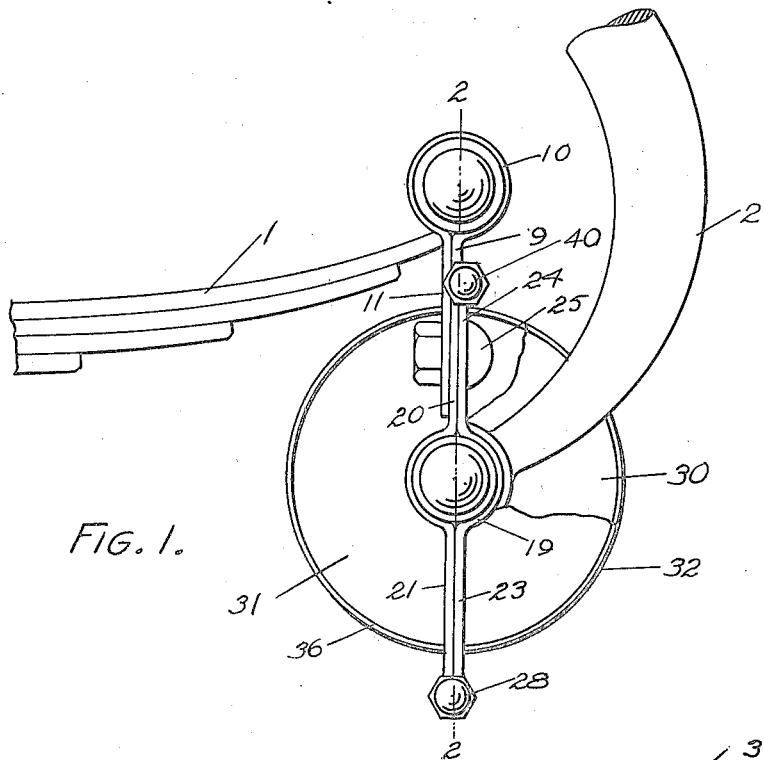
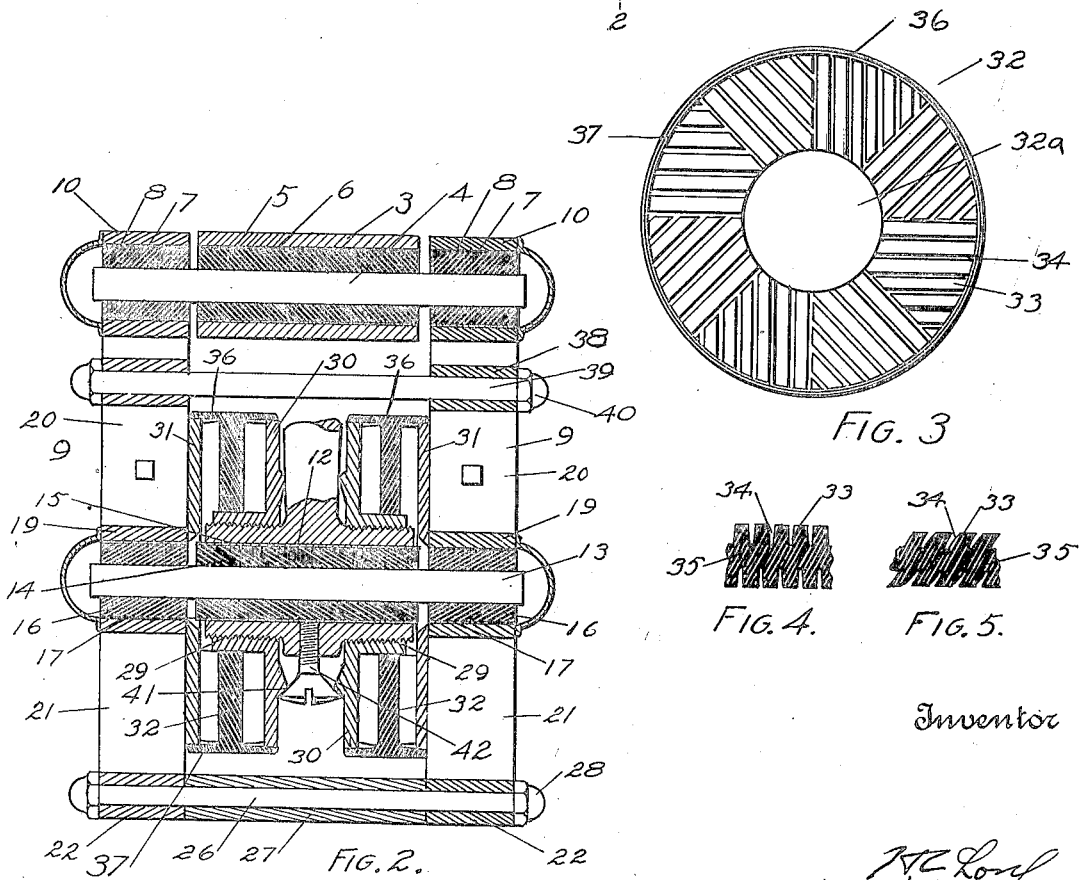
Inventor
H. C. Lord
Attorney Patented Oct. 19, 1926.

1,603,348

UNITED STATES PATENT OFFICE.

HUGH C. LORD, OF ERIE, PENNSYLVANIA.

VIBRATION DAMPENER.

Application filed December 19, 1924. Serial No. 756,949.

In many situations it is desirable to dampen vibrations, particularly periodic vibration. This has been accomplished by different devices but usually by introducing some friction element which is subjected to the movement of the parts. Such devices usually retard the free movement of the parts a great deal more than is desirable in order to accomplish the dampening action. With the present invention I utilize a rubber dampening element which is arranged in contact with a movable rub plate and yelds with the initial movement of the parts without rubbing and thus permits of free or resilient movement of the parts initially with an ultimate rubbing or friction action which will dampen or retard any periodic vibration. The device also operates as a shock absorber.

In carrying out the invention for a spring dampener I preferably utilize the elongation of the spring operating through the ordinary shackle hangers as a medium for introducing the dampeners between the movable members. Features and details of the invention will appear from the specification and claims.

The invention is illustrated in the accompanying drawings as follows:—

Fig. 1 shows a side elevation of a spring end and support.

Fig. 2 a section on the line 2—2 in Fig. 1.

Fig. 3 a side elevation of one of the rubber dampening pads.

Fig. 4 an edge view of one of the pads at rest.

Fig. 5 a similar view with the pad under stress.

1 marks the spring, 2 a goose neck which carries a frame (not shown) supported on the spring, and 3 the spring eye.

A joint is secured to the spring eye, which, as shown comprises a central pin 4, an intervening portion 5 of rubber, and an outer shell 6, the shell 6 being clamped in the spring eye and the rubber being bonded to the pin 4 and the shell. At each end of the spring eye, rubber elements 7 are bonded to the pin 4 and shells 8 are bonded to the rubber 7. Shackle hangers 9 have clamping eyes 10 at each side in which the shells 8 are clamped, the hanger being formed of a strip of sheet metal and the clamping end 11 extending from the eye 10. The goose neck 2 has the eye or joint opening 12 and a joint is arranged in this eye similar to the joint in the spring eye comprising a central pin 13, the rubber element 14 bonded to the pin 13 and a shell 15 bonded to the rubber element, the shell 15 being clamped or secured by a pressed fit in the eye 12. Rubber elements 16 are bonded to the outer ends of the pin and shells 17 are bonded to the rubber elements 16. Hanger eyes 19 clamp the shells 17, the hanger eyes being formed in the strap metal which has an extension 20 leading from the eye 10, the loop forming part of the eye 19, an extension 21, a loop 22 a return portion 23 and the loop forming part of the clamping eye 19 a clamping extension 24. A clamping bolt 25 extends through the extensions 24, 22, 20 and 11, thus closing and clamping the eyes 10 and 19. A pin 26 extends through the loops or eyes 22 in opposing hangers, a distance piece 27 being arranged between the hangers and a nut 28 clamping the hangers against the distance piece 27.

While I have shown a special hanger and a special joint the dampener which is hereinafter described may be arranged with any ordinary hanger and joints except that these joints do not require oil and the rubbing element of the dampener being rubber is more or less sensitive to oil so that where the ordinary joints are used some provision should be made for protecting the rubber from the oil.

The eye 12 of the goose neck is screw-threaded at 29. A plate 30 having a hub extension is screwed on to the threads 29 at each side of the goose neck. An opposing rub plate 31 in the form of a metal disc is spot welded or secured to the shackle hangers 9. A rubber friction element 32 is interposed between the rub plates 30 and 31. This element has a series of ribs 33 separated by grooves 34. The ribs 33 have a general direction from the center outwardly so that the movement of the rub plate is across the ribs. It has a central opening 32$^a$ which permits it to be placed over the hub of the plate 30. The ribs 33 extend each side of a central portion 35, the ribs being preferably staggered in their arrangement on opposite sides of the central portion 35.

With the friction element 32 in place between the rub plates, the plates 30 are screwed outwardly sufficiently to put pressure on the friction element. In order to prevent the spreading of the hangers the hangers are provided with eyes 38 through which a tie bolt 39 extends, the tie bolt having a nut 40. The bolt 39 and bolt 26 therefore sustain the outward thrust exerted by the rub plates 30.

As the spring elongates under pressure it swings the shackle hanger in the usual well known manner and thus gives to the rub plates relative rotative movement. The rubber friction element between these plates is subjected to this rotative movement. With the initial rotative movement the rubber ribs and body of the rubber are simply distorted as indicated in Fig. 5, there being no initial slipping of the rubber on the plates. When, however, there is an excessive movement of the rub plates the resistance of the rubber to distortion becomes greater than the friction resistance between the rubber and the rub plates and from this point on in the movement the relative movement is accommodated by slippage between the contact surfaces of the rubber and the rub plates. With this arrangement, therefore, the initial movement which takes care of the ordinary riding vibrations of a spring are accommodated by the distortion of the rubber and the periodic movements which are usually of greater amplitude are dampened by a relative movement of the rubber element on the rub plate. Thus the tendency to periodic movement is checked without seriously impeding the resilience of the springs to initial road shocks and particularly the static friction which ordinarily communicates shock to the body with its initial movement so far as its detrimental effect is concerned avoided.

While a solid pad of rubber may be used giving a continuous contact between the rubber and the plate I prefer to avoid such continuous surface because of the tendency of such a pad to seat itself or "freeze" to the plate, thus entirely changing its action and eliminating the frictional movement. Further the ribs permit of a greater distortion where it is desired.

It is desirable to seal the friction surfaces and this is accomplished in the present device by providing an annular lip 36 extending from the body 35 over the edges of the plates 30 and 31. This lip is preferably detached from the ribs 33 by the interposition of a groove 37.

In order to lock the plates 30 in adjustment they are provided with tapered annular surfaces 41 which are engaged by the bevelled head of a screw 42, the screw 42 extending into the goose neck.

It will be noted that there is a greater movement at the outer ends of the ribs than at the inner ends of the ribs and that some of the ribs are more nearly radial than the others, thus making them more readily yieldable to the side or rotative thrust. In consequence the frictional movement between the rubber and the rub plate is progressive starting at some parts of the surface with a comparatively short initial movement and starting with some of the other parts of the surface only after there is a considerable rotative movement. This obviates the jerk necessary to overcome the static friction where the entire pad is started frictionally at once.

What I claim as new is:—

1. In a vibration dampener, the combination of two relatively movable members; a rub plate on one member; and a rubber pad on the other member wiping the rub plate with a movement of the members, said pad and plate having their contact broken at intervals.

2. In a vibration dampener, the combination of two relatively movable members; a rub plate on one member; and a rubber pad on the other member wiping the rub plate with a movement of the members, said pad and plate having their contact broken at intervals, said pad having a broken rub surface.

3. In a vibration dampener, the combination of two relatively rotatable members; a rub plate on one member; and a rubber pad on the other member, said pad yielding without sliding with the initial movement of the member and rubbing with a maximum movement of said members.

4. In a vibration dampener, the combination of two relatively rotatable members, opposing rub plates one on each member; and a rubber pad between said rub plates, said pads yielding without sliding with the initial movement of said plates and rubbing with a maximum movement of said plates.

5. In a vibration dampener, the combination of two relatively rotatable members; a rub plate on one member; and a rubber pad on the other member, said pad yielding without sliding with the initial movement of the member and rubbing with a maximum movement of said members, said pad and plate having their contact broken at intervals.

6. In a vibration dampener, the combination of two relatively rotatable members; a rub plate on one member; and a rubber pad on the other member, said pad yielding without sliding with the initial movement of the member and rubbing with a maximum movement of said members, said pad having its rubbing surface broken.

7. In a vibration dampener, the combination of two relatively rotatable members; a rub plate on one member; and a rubber pad on the other member, said pad yielding without sliding with the initial movement of the member and rubbing with a maximum movement of said members, said pad being provided with ribs having a general direction from the center outwardly.

8. In a vibration dampener, the combination of two relatively rotatable members; opposing rub plates, one on each member; and a rubber pad between said rub plates, said pads yielding without sliding with the initial movement of said plates and rubbing with a maximum movement of said plates, said pads being provided with ribs having a general direction from the center outwardly.

9. In a vibration dampener, the combination of two relatively rotatable members; opposing rub plates one on each member; a rubber pad between said rub plates, said pads yielding without sliding with the initial movement of said plates and rubbing with a maximum movement of said plates; and means for sealing the rub surface against moisture.

10. In a vibration dampener, the combination of two relatively rotatable members; opposing rub plates one on each member; a rubber pad between said rub plates, said pads yielding without sliding with the initial movement of said plates and rubbing with a maximum movement of said plates; and means for sealing the rub surface against moisture comprising an annular lip on the pads extending over the rub plates.

11. In a vibration dampener, the combination of two relatively rotatable members; opposing rub plates one on each member; a rubber pad between said rub plates, said pads yielding without sliding with the initial movement of said plates and rubbing with a maximum movement of said plates, said rubber pads having radial ribs; and means for sealing the rubbing surfaces against moisture comprising an annular lip on the rubber pads, said lips being detached from the ribs.

12. In a vibration dampener, the combination of two relatively rotatable members; a rub plate on one member; a rubber pad on the other member, said pad yielding without sliding with the initial movement of the member and rubbing with a maximum movement of said members; and means for varying the pressure between the pad and plate.

13. In a vibration dampener, the combination of two relatively rotatable members; opposing rub plates, one on each member; a rubber pad between said rub plates, said pads yielding without sliding with the initial movement of said plates and rubbing with a maximum movement of said plates; and means for adjusting the plates relatively to each other to vary the pressure between the plates and pads.

14. In a vibration dampener, the combination of a spring having a spring eye; shackle hangers having a joint connection with the spring eye; a frame member; a joint connection between the opposite end of the hanger and the frame member; and a dampening device comprising relative rotative members mounted between the hangers having one element secured to the frame member and the other to the hanger.

15. In a vibration dampener, the combination of a spring having a spring eye; shackle hangers having a joint connection with the spring eye; a frame member; a joint connection between the opposite end of the hanger and the frame member; and a dampening device comprising two rub plates secured to the frame member and facing the hangers, a rubber pad engaging said rub plates, and opposing rub plates secured to the hangers.

16. In a vibration dampener, the combination of a spring having a spring eye; shackle hangers having a joint connection with the spring eye; a frame member; a joint connection between the opposite end of the hanger and the frame member; and a dampening device comprising two rub plates secured to the frame member and facing the hangers, a rubber pad engaging said rub plates, and opposing rub plates secured to the hangers, the rub plates on the joint member being adjustable.

17. In a vibration dampener, the combination of a spring having a spring eye; shackle hangers having a joint connection with the spring eye; a frame member having screw threaded extensions with a joint eye therein; a joint connection between the hangers and the frame member at the eye; rub plates screwed on the extensions; friction pads on the rub plates; and rub plates on the hangers.

18. In a vibration dampener, the combination of two relatively movable members; a rub plate on one member; and a rubber pad on the other member wiping the rub plate with a movement of the members, said rubber yielding without sliding with the initial movement of the member and rubbing with a maximum movement of the members, the yielding of the pad varying in different parts of the pad.

19. In a vibration dampener, the combination of two relatively movable members; a rub plate on one member; and a rubber pad on the other member wiping the rub plate with a movement of the members, said rubber yielding without sliding movement with the initial movement of the member and rubbing with a maximum movement of said members, some parts of the pad starting its frictional movement prior to the starting of the frictional movement in other parts of the pad.

20. In a vibration dampener, the combination of two relatively movable members; a rub plate on one member; a rubber pad on the other member; and means exerting a constant pressure between said rub plate and pad, said pad yielding without sliding with the initial movement of the members and rubbing with a maximum movement of said members.

21. In a vibration dampener, the combination of two relatively movable members; a rub plate on one member; a rubber pad on the other member; and means adjustably exerting a constant pressure between the rub plate and the pad, said pad yielding without sliding with an initial movement of the members and rubbing with a maximum movement of said members.

22. In a vibration dampener, the combination of two relatively movable members; a friction member yieldingly carried by one of the movable members and rubbing with the other movable member; and means for applying constant pressure on the friction member, said friction member yielding without sliding with an initial movement of the movable members and rubbing with a maximum movement of said members.

23. In a vibration dampener, the combination of two relatively movable members; a friction member yieldingly carried by one of the movable members and rubbing with the other movable member; and means for applying an adjustably constant pressure on the friction member, said friction member yielding without sliding with an initial movement of the movable members and rubbing with a maximum movement of said members.

24. In a vibration dampener, the combination of two rotatable members; and a friction plate between the members yielding with relation to one member and rubbing with relation to the other member, said friction member yielding without sliding with an initial movement of the movable members and rubbing with a maximum movement of said members.

25. In a vibration dampener, the combination of two relatively rotatable members axially opposed; and a friction plate between the members yielding with relation to one member and rubbing with relation to the other member, said friction member yielding without sliding with an initial movement of the movable members and rubbing with a maximum movement of said members.

In testimony whereof I have hereunto set my hand.

HUGH C. LORD.